(12) United States Patent
Rocher et al.

(10) Patent No.: US 7,509,714 B2
(45) Date of Patent: Mar. 31, 2009

(54) NEEDLED GLASS MAT

(75) Inventors: Gilles Rocher, Chambery (FR);
Francois Roederer, Chambery (FR);
Livio Lionetti, Gazzaniga (IT); Claire Metra, Challes les Eaux (FR)

(73) Assignee: OCV Intellectual Capital, LLC DE (US)

( * ) Notice: Subject to any disclaimer, the term of this patent is extended or adjusted under 35 U.S.C. 154(b) by 0 days.

(21) Appl. No.: 10/580,936

(22) PCT Filed: Oct. 7, 2004

(86) PCT No.: PCT/FR2004/050495

§ 371 (c)(1),
(2), (4) Date: Dec. 5, 2006

(87) PCT Pub. No.: WO2005/054559

PCT Pub. Date: Jun. 16, 2005

(65) Prior Publication Data

US 2007/0101561 A1    May 10, 2007

(30) Foreign Application Priority Data

Nov. 28, 2003  (FR) ................................. 03 13977

(51) Int. Cl.
*D04H 3/10* (2006.01)
*D04H 1/46* (2006.01)
(52) U.S. Cl. .......................................... 28/114; 28/107
(58) Field of Classification Search ............ 28/107, 28/111, 112, 114, 115, 113, 108–110; 65/90, 65/62, 479, 508, 505, 529
See application file for complete search history.

(56) References Cited

U.S. PATENT DOCUMENTS

| 2,339,431 | A | * | 1/1944 | Slayter ...................... 428/213 |
| 2,794,237 | A | * | 6/1957 | Dildilian et al. ............... 28/112 |
| 3,608,166 | A | * | 9/1971 | Gruget ......................... 28/112 |
| 3,853,651 | A | * | 12/1974 | Porte ........................... 28/107 |
| 3,975,565 | A | * | 8/1976 | Kendall ........................ 28/107 |
| 4,277,531 | A | * | 7/1981 | Picone ...................... 442/367 |
| 4,404,717 | A | * | 9/1983 | Neubauer et al. ............. 28/107 |
| 4,457,055 | A |   | 7/1984 | Ambrose et al. |
| 4,847,140 | A | * | 7/1989 | Jaskowski .................. 428/220 |
| 4,948,649 | A | * | 8/1990 | Hiers et al. ................... 28/107 |
| 4,963,176 | A |   | 10/1990 | Bailey et al. |

(Continued)

FOREIGN PATENT DOCUMENTS

EP        0 296 970       12/1988

(Continued)

*Primary Examiner*—Amy B Vanatta
(74) *Attorney, Agent, or Firm*—James J. Dottavio; Kathryn W. Grant

(57) ABSTRACT

A method for preparing a mat, including: a) deposition or projection of threads onto a traveling belt to form a lap of the threads that are driven by the belt, then b) needling by bearded needles passing through the lap and being displaced in the direction of the lap at substantially the same speed as that when they pass through the lap, with a stroke density ranging from 1 to 25 strokes per $cm^2$. By the method the mat obtained can easily be deformed by hand to be placed in a mold for manufacture of a composite material by injection of resin (RTM). The mat may also be incorporated into a preimpregnated sheet (SMC) and be molded under pressure.

12 Claims, 3 Drawing Sheets

U.S. PATENT DOCUMENTS

Figure 1:
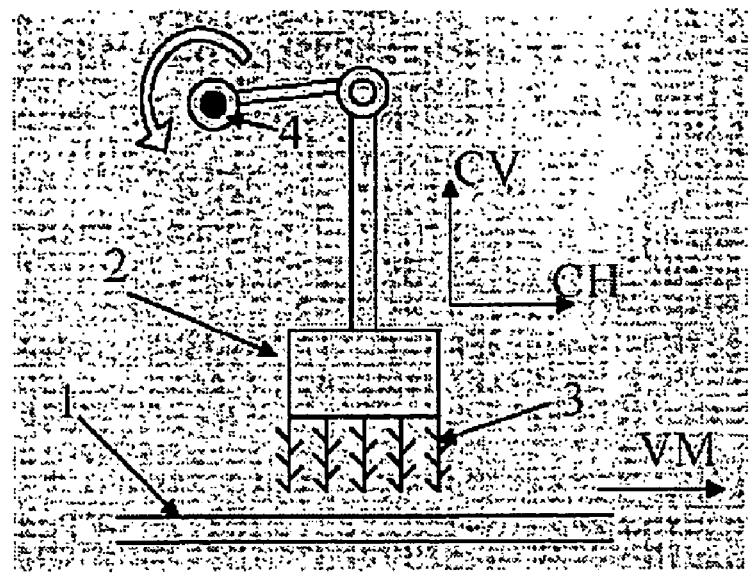

| | | | |
|---|---|---|---|
| 5,018,255 A * | 5/1991 | Bolliand | 28/107 |
| 5,213,735 A | 5/1993 | Schneider et al. | |
| 5,458,960 A * | 10/1995 | Nieminen et al. | 28/107 |
| 5,732,453 A * | 3/1998 | Dilo et al. | 28/114 |
| 6,034,006 A | 3/2000 | Arpin et al. | |
| RE36,756 E * | 6/2000 | Wahl et al. | 442/180 |
| 6,175,996 B1 | 1/2001 | Gstrein et al. | |
| 6,258,739 B1 | 7/2001 | Meng et al. | |
| 7,412,756 B2 * | 8/2008 | Droux et al. | 28/107 |
| 2004/0197552 A1 | 10/2004 | Maquin et al. | |

FOREIGN PATENT DOCUMENTS

| | | |
|---|---|---|
| EP | 1 048 887 | 11/2000 |
| FR | 2 463 221 | 2/1981 |
| FR | 2 494 632 | 5/1982 |
| FR | 2 830 878 | 4/2003 |
| FR | 2 833 204 | 6/2003 |
| JP | 61 154 812 | 7/1986 |
| JP | 10 306 203 | 11/1998 |

* cited by examiner

NEEDLED GLASS MAT

The invention relates to the manufacture of glass thread mats which can be used for the reinforcement of composite materials prepared, in particular, by injection (a method referred to as RTM from Resin Transfer Molding) or prepared from preimpregnated sheeting (synonym of SMC from Sheet Molding Compound). The mat according to the invention may also be impregnated directly with a thermosetting resin, in particular in order to produce translucent boards.

A mat for the reinforcement of composite materials must preferably possess the following properties:

- have sufficient cohesion to be windable and unwindable (for storage and transport),
- have sufficient cohesion to be cut into pieces, held in the hand and placed into the mold by hand (RTM),
- not prick the hands when it is handled or placed into the mold (RTM),
- be easily deformed by hand when it is placed into the mold manually (RTM),
- correctly preserve the shape given by hand in the mold (RTM),
- be impregnated as easily as possible with the injection resin or the SMC (usually of the polyester type and sometimes of the epoxy type),
- have the most homogeneous structure possible, in particular without holes or other surface feature capable of causing a mark on the surface of the final composite material,
- reinforce the composite material as much as possible.

It is desirable, moreover, to be able to manufacture it

- at the highest possible speed,
- with the fewest possible steps,
- using the least possible chemical products (such as binders).

The final composite material must generally possess the highest possible impact resistance, the lowest possible uncontrolled porosity (no gas bubbles unintentionally trapped) and the best possible surface appearance, in particular the edge (narrow face) of the final pieces.

The use of continuous threads leads to an unexpected advantage in terms of the surface appearance and, more particularly, of the edge of the final composite materials and in terms of the homogeneity of the distribution of the fibers in the final composite material. To be precise, the applicant discovered that the edge of the molded pieces was much cleaner and smoother and better formed than when cut threads were used. Without this explanation being capable of limiting the scope of the present application, it seems that the use of cut threads involves a large quantity of cut thread ends being located on the surface or just below the surface of the edges of pieces. This phenomenon is due to the fact that the cut threads naturally have an orientation parallel to the main faces of the composite material. This accumulation of cut thread ends at the edges seems to be conducive to the presence of porosities at the edges by the commencement of the method. The bubbles formed then expand under the effect of temperature (of the order of 200° C. for the solidification of the thermosetting resin), thus tending to deform the surface appearance of the edges. It seems that the use of continuous threads considerably reduces this phenomenon. To be precise, in place of a thread end at the surface (situation where cut threads are used), there will instead be a continuous thread loop, thus tending toward a smoother surface.

As regards the SMC application, the mat must, moreover, be capable of flowing easily during press molding. It will be recalled that, before molding, an SMC takes the form of a preimpregnated sheet containing a thermosetting resin, said sheet containing in its middle a lap of reinforcement threads. According to the prior art, these threads are, systematically, cut threads. To be precise, in the mold, the SMC is subjected to a pressure and must flow easily in order to fill the entire volume of the mold under the effect of the pressure. For a person skilled in the art, this flow is possible due to the fact that the threads are cut and can easily be displaced with respect to one another. The area of SMC before pressing generally constitutes only about 30% of the area of the final composite material. There is a change from 30% to 100% under the pressing effect. According to the prior art, in order to prepare an SMC, cut threads are projected onto the traveling resin-based paste lap, and another paste lap is deposited on top in order to trap the cut threads in the same way as in a sandwich. The SMC is subsequently wound up and stored. It is unwound in order to cut off a piece (usually called a "preimpregnated blank"), the area of which constitutes only 30% of the area of the final piece, said piece is placed into a mold, and hot press molding is carried out. The thermosetting resin cures during this treatment. Within the scope of the present invention, it was discovered, in particular, that continuous threads could be used instead of cut threads in SMC technology. To be precise, unexpectedly, the lap of continuous threads can flow sufficiently during the pressing of the SMC. Whereas, according to the prior art, a cut thread mat is never used for the SMC application (since the cut threads are projected and since a mat is not isolated in an intermediate stage), it was then discovered that the thread mat according to the invention (cut or continuous threads) could be used within the framework of the SMC technique. The SMC use of continuous threads leads, moreover, to an unexpected advantage in terms of the surfaces and, more particularly of the edges of the final composite materials. To be precise, the applicant discovered that the edge of the molded pieces was much cleaner and smoother and better formed than when cut threads were used. Furthermore, if cut threads are used, the necessary flow of the SMC during molding results in a preferred orientation of the threads, which may give rise to surface undulations. To be precise, since the cut threads are independent, they follow flows too easily and are oriented according to the flow lines. The threads may even agglomerate or form bundles by following these flows too closely. By contrast, continuous threads withstand any orientation on account of their length, while at the same time sufficiently following the expansion of the SMC during pressing. Consequently, the use of continuous threads leads to a greater homogeneity in the reinforcement of the composite material. With an identical thread linear density, use of continuous threads generally leads to a composite material having a 5 to 12% higher rigidity, as compared with a use of cut threads.

The manufacture of a mat for the reinforcement of composite materials via the RTM method generally involves the deposition or projection of freshly sized threads on a traveling belt. However, the bed of threads does not at this stage have any consistency and cannot be handled. Nor can it be wound or unwound since its various thread layers would be intermingled. It must therefore be bound either chemically or mechanically.

In order to bind it chemically, a chemical binder of the thermoplastic or thermosetting type, usually in powder form, is applied to it, and thermal treatment is subsequently carried out, which melts the thermoplastic binder or polymerizes the thermosetting binder and finally, after cooling, produces bridges between the threads. However, this binder imparts a spring effect to the structure of the mat which then tends not to preserve certain less progressive shapes (for example, in the corners of the mold). On the other hand, it is desirable to limit the use of chemical products in a spirit of respect for the environment. Moreover, the thermal treatment for melting the thermoplastic binder is at a relatively high temperature (220-250° C.), thus leading to a harsh baking of the size, which makes the threads and therefore the mat more rigid and more difficult to deform (the glass network is then blocked).

In order to bind a mat mechanically, it may be subjected to conventional needling. However, this generally leads to the breaking of threads, thus causing a drop in the mechanical properties, and to the formation of spikes emerging from at least one face of the mat. These spikes then prick the hands of the handlers. Moreover, since the mat advances whereas the needles planted in the mat are fixed horizontally and are displaced only vertically, this gives rise to larger perforations than the cross section of the needles, thus tending to twist the needles. These perforations mark the surface, thus resulting in surface defects in the final piece. To be precise, these holes are filled with resin, and, because of the shrinkage of the resin after polymerization, depressions remain visible on the surface.

There are known mats comprising a central core of crimped polypropylene (PP) fibers and outer layers of cut glass threads, the entire assembly being bound by means of a stitched seam consisting of synthetic thread, such as polyester (PET). The crimped fiber tends to give the mat volume in order to make it easier for the resin to penetrate and in order to fill the air gap of the mold (the space between the two metal parts of the mold). However, neither PET nor PP fiber reinforces the composite material. Furthermore, the stitched seam is visible in the final composite material, and, moreover, the needles used for the stitched seam give rise to holes on the surface. These holes are filled with resin and, because of the shrinkage of resin after polymerization, depressions remain visible on the surface.

U.S. Pat. No. 4,277,531 (or FR 2463221) teaches the needling of a mat of continuous glass fiber strands, typically producing 5 to 8% of broken filaments. The needling produces 200 to 600 penetrations per 6.45 $cm^2$ (that is to say, per square inch), hence 31 to 93 penetrations per $cm^2$. The manufacturing speed is necessarily very low (of the order of 1 to 2 meters per minute).

U.S. Pat. No. 4,335,176 (or FR 2494632) teaches a needled mat of continuous glass threads which is produced by passing a mat of non-bound continuous glass threads through a felting loom or a conventional needling machine equipped with bearded needles. During the passage through the needling machine, the mat is perforated by a series of rows of these needles, in order to entangle the glass threads and sever the threads so as to provide a mechanically assembled mat containing short threads and filaments. After needling, one of the surfaces of the mat comprises a denser accumulation of fibers projecting from the surface, which may be referred to as spikes. The other face has 25 to 50% fewer spikes than the dense surface.

U.S. Pat. No. 4,404,717 (or FR 2502199) teaches a method for the manufacture of a needled felt from a continuous lap of glass fibers containing an appreciable quantity of moisture, the lap undergoing air treatment in order to dry it before it enters the needling machine equipped with hooked needles. This treatment causes a lower soiling of the needling machine on account of the fiber sizing binder.

The invention solves the abovementioned problems. According to the invention, a very special needling is carried out on the mat, giving the latter sufficient consistency, not breaking any or only very few threads and not forming any holes which are too large. The mat according to the invention is sufficiently deformable by hand at ambient temperature, and it is highly permeable to the resin. According to the invention, the needling is carried out by needles which are displaced at the same time as the mat, at substantially the same speed as the mat, in a direction parallel to the direction of displacement of the mat. Moreover, the number of needle impacts is reduced and is at most 25 strokes per $cm^2$, preferably at most 15 strokes per $cm^2$, and even more preferably at most 10 strokes per $cm^2$. In general, the number of needle impacts is at least one stroke per $cm^2$, preferably at least two strokes per $cm^2$.

It will be recalled that mats and felts differ markedly from one another in as much as a mat is a planar article which can be used as a reinforcement, whereas a felt is an article which has volume and which can be used as thermal insulation. A mat generally has a thickness ranging from 0.8 to 5 mm, more generally from 1 to 3 mm, whereas a felt is much thicker and generally has a thickness greater than 1 cm. A felt usually has a density ranging from 85 to 130 $kg/m^3$. A mat is much denser since its density may be of the order of 300 $kg/m^3$. However, the density of a mat is never expressed in mass per unit volume, but in mass per unit area, as a planar reinforcement.

The invention therefore relates in the first place to a method for preparing a mat, comprising
 a) the deposition or projection of threads onto a traveling belt in order to form a lap of said threads which is driven by said belt, then
 b) needling by bearded needles passing through said lap and being displaced in the direction of the lap at substantially the same speed as that when they pass through the latter, with a stroke density ranging from 1 to 25 strokes per $cm^2$.

Preferably, the beards of the needles are directed toward their support (usually called a needle board). Preferably, at least 1 beard, preferably 2 beards, of each needle pass through the thickness of the mat at each stroke. Preferably, the depth of penetration of the needles (needle length emerging from the mat after passing through the latter) ranges from 5 to 20 mm. Preferably, the needles have a diameter (smallest circle entirely containing any cross section of the needle, including the beards) ranging from 0.2 to 3 mm, even more preferably from 0.5 to 1.5 mm. Such needling leads to a handleable mat which is windable and unwindable, is easily deformable by hand in the mold, does not prick the hands and has no hole marks on the surface. By virtue of this very special needling, the mat can be advanced at high speeds, for example at least 2 meters per minute and even at least 5 meters per minute and even at least 8 meters per minute. In general, the speed is at most 35 or even at most 30 meters per minute, or even at most 20 meters per minute. During the passage of the needles through the mat, the threads are taken up in the beards and driven to form loops through the mat, without any breaking of the threads. These loops bind the mat and can easily be deformed, while at the same time preserving the function of a binder during introduction in the mold. These loops do not prick the hands on account of the non-breaking of the threads.

In order to carry out such needling, it is possible, for example, to use certain cylinder-type preneedling machines normally designed for processing polymer fiber felts, such as, for example, the machine designated PA169 or PA1500 or PA2000 sold by Asselin (NSC group). In this type of machine, the needles describe an elliptic movement with a horizontal component allowing the needles in the mat to follow the latter in its displacement.

The mat according to the invention generally has a mass per unit area ranging from 50 to 3000 $g/m^2$. It may be a mat with cut threads or a mat with continuous threads. Thus, before needling, cut threads, generally with a length of between 10 and 600 mm, more particularly of 12 to 100 mm, or continuous threads are deposited or projected onto the belt traveling in the direction of the needling machine. Where continuous threads are concerned, these, the number of which may range from 5 to 1200, are projected onto the traveling belt by means of an arm oscillating transversely with respect to the direction of travel of the belt. For the technique of projecting continuous threads, reference may be made, for example, to WO 02/084005. Each of the projected threads may comprise 20 to 500 unit fibers (in fact, continuous filaments). Preferably, the thread has a linear density ranging from 12.5 to 100 tex (g/km).

The material forming the fibers (continuous filaments) and therefore the threads may comprise a fiberable glass, such as glass E, or the glass described in FR2768144 or an alkaline-resistant glass, called AR glass, which comprises at least 5 molar % of $ZrO_2$. Particularly the use of AR glass leads to a mat effectively reinforcing cement matrices or capable of reinforcing thermosetting matrix composite materials which are to come into contact with a corrosive environment. The glass may also be free of boron. Moreover, it is also possible to use a mixture of glass fibers and of threads consisting of polymer, such as polypropylene, in particular the mixed threads sold under the trademark Twintex® by Saint-Gobain Vetrotex France. The threads used for producing the mat therefore comprise glass fibers (filaments).

The invention also relates to a method for the manufacture of a mat, comprising the needling step already described. Before needling, the cut or continuous threads are deposited or projected onto a traveling belt. At this stage, the threads may be dry, either because they come from rovings (or bobbins) or because they have been dried after sizing and before the needling according to the invention. However, the applicant noted that it was advantageous for the threads to be moist in order to enter the needling machine. To be precise, the passage of the belt (having served for receiving the fibers) of the needling machine takes place much more easily because the threads stick to one another a little due to the adhesive effect imparted by the liquid impregnating them. This adhesive effect may, in particular, be that originating naturally from the sizing of the fibers just after fibering. Thus, the jump or passage of the belt of the needling machine, even when the threads are not yet bound, takes place more efficiently on account of the coherence of the lap due to its impregnated state. If the threads are dry at the outset, they may even be impregnated deliberately before needling, so as to facilitate the passages from one device to the other, more particularly the jump of the fiber receiving belt at the needling machine.

The mat according to the invention may undergo at least one drying, depending on circumstances. If the threads used are dry at the outset and if the threads are not impregnated with any liquid, drying is not necessary. Drying is necessary if the threads are impregnated with a liquid at a moment of the manufacture of the mat according to the invention. In general, the threads are freshly sized at the moment of their use in the method according to the invention. Thus, it is possible to dry the threads on the traveling belt before the needling. However, as already stated, it is preferable to preserve the impregnated state of the needling, and the lap of threads is therefore preferably dried only after needling. Drying may be carried out by the passage of the traveling belt through an oven at a temperature ranging from 40 to 170° C., more particularly from 50 to 150° C. Such thermal treatment does not result in an excessive hardening of the sizing of the threads which preserve their entire flexibility.

The mat according to the invention may be integrated into a complex comprising a plurality of juxtaposed layers. In particular, the mat according to the invention, in its variant using continuous threads, may form the layer, with randomly distributed continuous threads, of the fibrous structure which is the subject of WO 03/060218, the text of which is incorporated herein by reference. More particularly, the mat according to the invention may be incorporated into a multilayer complex having the following structure: the mat according to the invention+the layer of cut threads on one side of the mat according to the invention or mat according to the invention+layer of cut threads on both sides of said mat (complex with two or three layers). Thus, it is possible to deposit a first layer of fibers (for example, threads cut, for example, to a length of between 12 and 100 mm) onto the traveling belt and then to deposit the threads onto this layer in order to form the mat according to the invention, then to carry out the needling according to the invention and thereby bind the two layers together with one another by means of the needling. A third layer (for example, threads cut, for example, to a length of between 12 and 100 mm) may also be added before the needling according to the invention.

At the end of the manufacture of the mat, it is possible, if appropriate, to carry out a cutting off of the borders of the mat strip formed, since the borders may possibly have a structure or density a little different from the central part.

There would be no departure from the scope of the invention if one of the following procedures was adopted:
a) binding the fibers of the mat by means of a water-soluble binder (example: a polyvinyl alcohol) before the needling, then removing the binder by dissolving in water or in an aqueous solution before needling;
b) binding the fibers of the mat by means of a water-soluble binder (example: a polyvinyl alcohol) before the needling, then removing the binder by dissolving in water or in an aqueous solution after needling;
c) depositing or projecting the threads onto a film, itself resting on a traveling belt, then winding the nonbound lap of threads at the same time as the film (the latter preventing the various wound layers from being intermingled), for possible intermediate storage, then unwinding the double film/lap layer, removing the film and replacing the lap on a traveling belt in order to continue the method according to the invention.

The mat obtained by means of the method according to the invention does not contain any binder. It is symmetrical with respect to a plane which is parallel to it and passes through its center. It has sufficient cohesion to be wound in the form of a roll and be unwound for use.

The invention leads, in particular, to a needled mat of continuous threads or of cut threads (preferably of continuous threads) consisting of glass fiber, if appropriate sized, and without any needle holes visible to the naked eye. This mat therefore contains maximum glass for reinforcing the composite material as much as possible, in the absence of synthetic materials based on polymers (PP, polyester, etc.) which are not reinforcing for the composite material, with the exception of the possible organic components of the sizing of the fibers. This mat is advantageously used for reinforcing a composite material in the closed-mold injection method (RTM) or within the framework of the SMC technology, or in order to be impregnated directly with resin to produce boards which, in particular, are translucent.

The mat obtained by means of the method according to the invention may be integrated into a preimpregnated sheet (SMC). The mat according to the invention is then inserted continuously between two layers of thermosetting resin paste. Said mat is unwound and then integrated directly between two layers of resin paste. In addition to the mat according to the invention, the addition of other reinforcing layers in the SMC, such as, for example, cut threads, especially of glass, is not ruled out. For example, the following procedure may be adopted:

unwinding of the mat according to the invention horizontally on a layer of resin paste, then projection of cut threads onto the mat, then unwinding of a layer of resin paste onto the cut threads.

A layer of cut threads may also be applied before the mat according to the invention is unwound.

The SMC sheet may serve for the manufacture of a composite material by the molding of the sheet by pressure on its main faces, thus resulting in a widening of the sheet in the mold before the solidification of the resin. Should the mat have continuous threads, the cut SMC sheet preferably has, before molding under pressure, an area constituting 50 to 80% of the area of the mold (and therefore of the area of the final piece).

Figure 4:
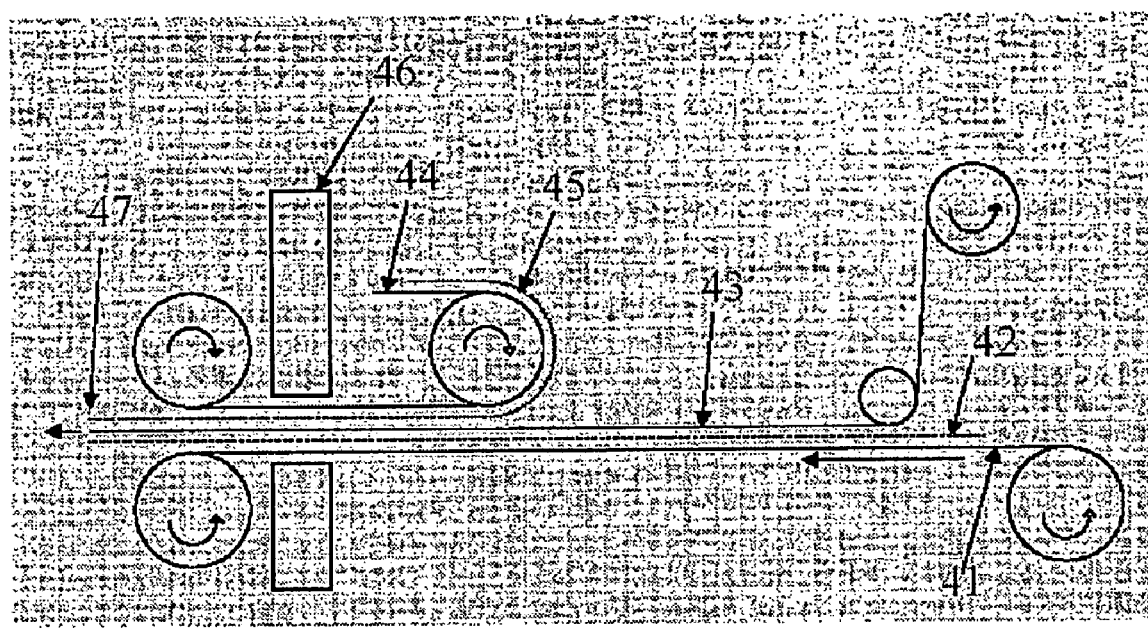

The fact that a chemical binder is not used in order to produce the mat according to the invention makes it possible to produce particularly translucent composite materials. To be precise, the applicant found that the absence of binder appreciably improved the translucency of the final composite material. In order to produce such translucent composite materials, it is possible, in particular, to use the method illustrated in FIG. 4. According to this method, a supporting film 41 (generally consisting of polyester) is unwound and has applied to it a layer 42 of gelcoat (generally a polyester resin). The mat 43 according to the invention is subsequently unwound onto said gelcoat layer. Another supporting film 44 is unwound in order to receive a gelcoat layer 45, this assembly 44/45 being applied to the mat according to the invention on the side of the gelcoat layer. The assembly is subsequently subjected to thermal treatment by means of the unit 46 in order to cure the gelcoat, then the two supporting films 41 and 44 are detached and the solid composite material is received at 47. If appropriate, the composite material may be given a special shape or profile just before solidification, for example a corrugation (example of use: roofs).

FIG. 1 illustrates highly diagrammatically the needling principle by virtue of which the needles accompany the mat when they penetrate the latter. The mat 1 advances under the board 2 provided with bearded needles 3 oriented toward their support (needle board), said board being driven in a movement having two components, one horizontal CH and the other vertical CV, by means of a system of connecting rods rotating about a fixed point 4. These various elements of the machine are dimensioned so that the horizontal component CH is substantially identical to the speed of the mat VM when the needles are in the mat. The illustration of FIG. 1 is highly diagrammatic, and what is preferred to a simple circular movement suggested by FIG. 1, even though it is already satisfactory, is an elliptic movement (the major axis of the ellipse being vertical and the minor axis of the ellipse being horizontal), making it possible for the horizontal component more effectively to follow the speed of the mat which is generally constant.

Figure 2:
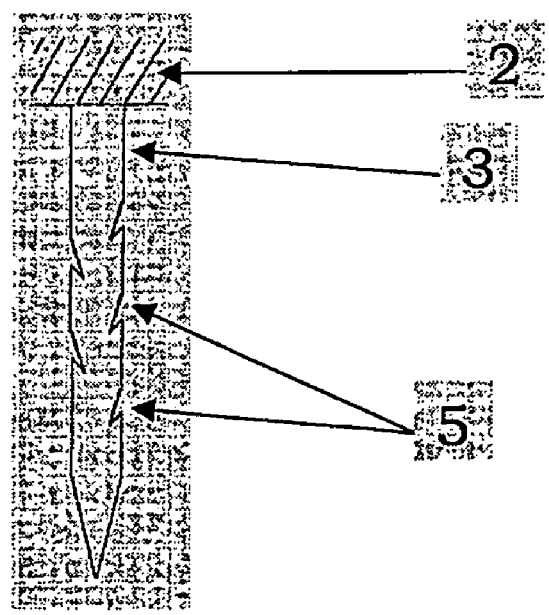

FIG. 2 illustrates a needle 3 fastened in the needle board 2. It can be seen that the needle is equipped with beards 5 directed toward the needle board, that is to say upward when the mat is under the needle board (the beards are directed in the same way as for a fishhook).

Figure 3:
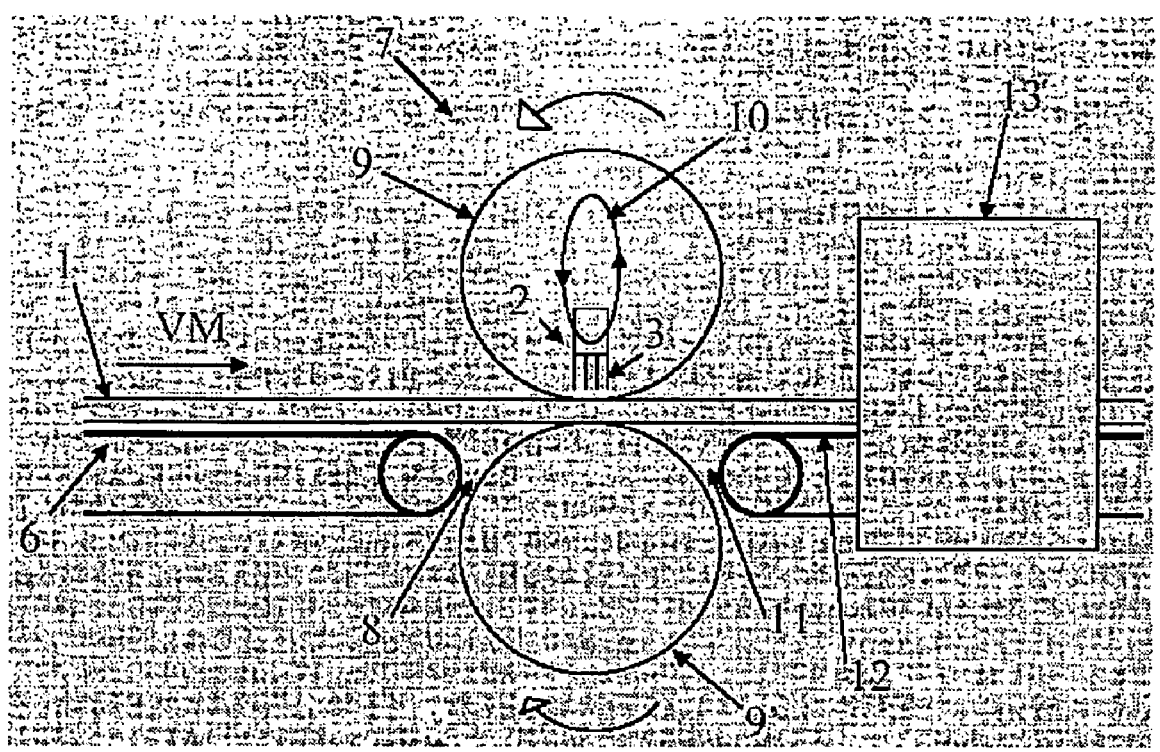

FIG. 3 illustrates diagrammatically the method according to the invention: the threads impregnated with sizing liquid and forming the lap 1 advance in the direction of the needling machine 7 by means of the belt 6. The lap passes at 8 from the belt 6 to the needling machine 7. The needling machine comprises two large perforated cylindrical elements 9 and 9' driven in rotation in correspondence with the speed of the belt 6. These two cylindrical elements nip the lap so as to cause it to advance without any distortion or elongations of the latter. The board 2 with needles 3 is located within the upper cylindrical element (the same system in the lower cylinder) and is driven in an elliptic movement 10, the horizontal component of which corresponds substantially to the speed VM of advance of the mat. The needles pass through the upper cylindrical element which is equipped with suitable orifices, then the lap in order to needle the latter, then, if appropriate, the lower cylindrical element, and then reascend upward along an elliptic path. Leaving the needling machine 7, the mat once again passes (or jumps) at 11 onto another belt 12 which delivers it into the oven 13. At the oven exit, the mat can be wound up and stored. At the time of its use, it can be unwound, cut, displaced, handled, placed and deformed in the injection mold in the most satisfactory way. It can easily be impregnated with the injection resin. It has good permeability to the resin, above all if it is obtained from continuous threads.

The invention claimed is:

1. A method for preparing a mat including glass fiber comprising:
    a) deposition or projection of threads including glass fibers onto a traveling belt to form a lap of the threads that is driven by the belt at a lap speed in a lap direction; then
    b) needling by bearded needles displaced in a direction parallel to the lap direction at substantially a same speed as the lap speed when they pass through the lap, with a stroke density ranging from 1 to 25 strokes per $cm^2$.

2. The method as claimed in claim 1, wherein the stroke density of the needling is at most 15 strokes per $cm^2$.

3. The method as claimed in claim 2, wherein the stroke density of the needling is at most 10 strokes per $cm^2$.

4. The method as claimed in claim 1, wherein the stroke density of the needling is at most 2 strokes per $cm^2$.

5. The method as claimed in claim 1, wherein the threads are continuous threads including the glass fibers.

6. The method as claimed in claim 1, wherein the threads are cut threads including the glass fibers.

7. The method as claimed in claim 1, wherein the needling is carried out by needles fastened to a support, the beards of the needles being directed toward the support.

8. The method as claimed in claim 1, wherein the lap and the mat derived from the lap advance at a speed of 2 to 35 meters per minute.

9. The method as claimed in claim 1, wherein the lap and the mat derived from the lap advance at a speed of at least 8 meters per minute.

10. The method as claimed in claim 1, wherein the lap and the mat derived from the lap advance at a speed of at most 20 meters per minute.

11. The method as claimed in claim 1, wherein the needles describe an elliptic movement.

12. The method as claimed in claim 1, wherein the mat does not contain any binder.

* * * * *